(12) United States Patent
Lischer

(10) Patent No.: US 9,932,896 B2
(45) Date of Patent: Apr. 3, 2018

(54) EXHAUST-GAS TURBOCHARGER

(75) Inventor: Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 569 days.

(21) Appl. No.: 13/511,348

(22) PCT Filed: Dec. 3, 2010

(86) PCT No.: PCT/US2010/058830
§ 371 (c)(1),
(2), (4) Date: May 22, 2012

(87) PCT Pub. No.: WO2011/084282
PCT Pub. Date: Jul. 14, 2011

(65) Prior Publication Data
US 2012/0328422 A1     Dec. 27, 2012

(30) Foreign Application Priority Data

Dec. 16, 2009  (EP) .................................... 09015573

(51) Int. Cl.
*F02C 6/12*        (2006.01)
*F01D 9/02*        (2006.01)
(Continued)

(52) U.S. Cl.
CPC ............... *F02C 6/12* (2013.01); *F01D 9/026* (2013.01); *F01D 9/04* (2013.01); *F01D 25/162* (2013.01);
(Continued)

(58) Field of Classification Search
CPC ........ F02C 6/12; F01D 25/243; F01D 25/246; F05D 2230/60; F05D 2260/33
(Continued)

(56) References Cited

U.S. PATENT DOCUMENTS 2,377,740 A * 6/1945 Alford ...................... 415/208.3
3,918,679 A * 11/1975 Silvana ...................... 251/149.1
(Continued)

FOREIGN PATENT DOCUMENTS

| CH | WO 2009101167 A1 * | 8/2009 | ............ F01D 25/243 |
| EP | 2090755 A1 * | 8/2009 | |
| GB | 589689 A | 6/1947 | |

OTHER PUBLICATIONS

Oeschger, Turboloader Housing, Aug. 19, 2009, EP2090755A1 abstract.*
(Continued)

*Primary Examiner* — Richard Edgar
*Assistant Examiner* — Michael Sehn
(74) *Attorney, Agent, or Firm* — Eric L. Doyle; Stephan A. Pendorf; Patent Central LLC

(57) ABSTRACT

The invention relates to an exhaust-gas turbocharger (1) having a compressor housing (3), having a bearing housing (28) which can be connected at one end to the compressor housing (3) by means of a first fastening device (19), and having a turbine housing (2) which can be connected to the bearing housing (28) at the other end of the latter by means of a second fastening device (20), with the compressor housing (3), the bearing housing (28) and the turbine housing (2) extending along an exhaust-gas turbocharger longitudinal axis (R), wherein the first fastening device (19) is designed as a plug-and-twist connecting device.

9 Claims, 3 Drawing Sheets

(51) Int. Cl.
*F01D 9/04* (2006.01)
*F01D 25/16* (2006.01)
*F01D 25/24* (2006.01)

(52) U.S. Cl.
CPC ......... *F01D 25/243* (2013.01); *F01D 25/246* (2013.01); *F05D 2220/40* (2013.01); *F05D 2230/60* (2013.01); *F05D 2230/64* (2013.01); *F05D 2230/642* (2013.01); *F05D 2260/30* (2013.01); *F05D 2260/33* (2013.01)

(58) Field of Classification Search
USPC .................................. 415/118, 213.1, 214.1
See application file for complete search history.

(56) References Cited

U.S. PATENT DOCUMENTS

| | | | |
|---|---|---|---|
| 4,364,717 A * | 12/1982 | Schippers | F01D 25/125 415/180 |
| 4,424,003 A * | 1/1984 | Brobeck | 416/241 B |
| 6,244,632 B1 * | 6/2001 | Gasparini | 285/401 |
| 7,008,182 B2 * | 3/2006 | Kopp et al. | 415/136 |
| 7,017,953 B2 * | 3/2006 | Benscoter et al. | 285/401 |
| 7,677,870 B1 * | 3/2010 | Matheny | 416/206 |
| 7,918,215 B2 * | 4/2011 | Martin et al. | 123/559.1 |
| 2004/0109761 A1 * | 6/2004 | Scherrer | 415/206 |
| 2007/0201977 A1 * | 8/2007 | Clarence et al. | 415/214.1 |
| 2007/0216161 A1 * | 9/2007 | Regener | F02B 33/44 285/377 |
| 2011/0091318 A1 * | 4/2011 | Kratschmer et al. | 415/205 |
| 2011/0103948 A1 * | 5/2011 | Kuzi et al. | 415/229 |

OTHER PUBLICATIONS

Office Action dated Oct. 8, 2014, in Chinese Application No. 201080054450.9 (with English language translation).

* cited by examiner

EXHAUST-GAS TURBOCHARGER

BACKGROUND OF THE INVENTION

Field of the Invention

The invention relates to an exhaust-gas turbocharger.

Description of the Related Art

An exhaust-gas turbocharger of said type is known for example from EP 1 734 231 A1. In a generic turbocharger, the mounting of the compressor housing on the bearing housing takes place by means of a fastening device in the form of a screw connection, which constitutes a time-consuming working step. This is because, firstly, a multiplicity of internal threads must be provided, and secondly, the screwing operation is carried out using suitable tools.

BRIEF SUMMARY OF THE INVENTION

It is therefore an object of the present invention to provide an exhaust-gas turbocharger which permits a simplification of the mounting of the compressor housing on the bearing housing and a considerable acceleration of said mounting process.

Said object is achieved by an exhaust-gas turbocharger (1), having a compressor housing (3), having a bearing housing (28) connected at one end to the compressor housing (3) via a first fastening device (19), and having a turbine housing (2) connected to the bearing housing (28) at the other end of the latter by means of a second fastening device (20), with the compressor housing (3), the bearing housing (28) and the turbine housing (2) extending along an exhaust-gas turbocharger longitudinal axis (R), wherein the first fastening device (19) is a plug-and-twist connecting device.

Since the first fastening device is designed as a plug-and-twist connecting device which, for mounting, requires merely a plugging movement and a subsequent rotational movement in order to lock the two components, the desired acceleration and simplification of the mounting process are obtained, wherein furthermore, no tools are required. Furthermore, a fastening device of said type permits fully automated mounting of the compressor housing on the bearing housing.

The subclaims relate to advantageous refinements of the invention.

The plug-and-twist connecting device according to the invention is of similar design to a bayonet connection and may have two fastener rings with corresponding locking teeth, which fastener rings can be attached to the compressor housing and to the bearing housing.

Here, it is possible for the fastener rings with their locking teeth to be formed out of the blanks of the bearing housing and of the compressor housing by means of a milling and turning process.

On the other hand, the fastener rings may however also be formed as separate parts which, after the production thereof, may be attached to the bearing housing and to the compressor housing for example by means of an interference fit or by shrink-fitting.

In the case of the compressor housing, it is preferably also possible for the fastener ring to be cast directly into the compressor housing.

The required pressing between the compressor housing and the bearing housing may be obtained by means of a run-on bevel on the respective contact surface of the toothing of the two halves.

In a particularly preferred embodiment, to secure the compressor housing when it is mounted on the bearing housing, it is possible to provide a securing pin which can be pressed in either by means of spring force or manually in order to prevent a release of the connection between the bearing housing and the compressor housing. To be able to check that a mounting process has been successful, said securing pin may be equipped with an indicator in order to indicate successful mounting. Here, when mounting of the securing pin has not taken place, the indicator projects out of the housing, whereas when mounting has taken place, said indicator is retracted into the housing. This type of mounting indicator can also be checked in an automated fashion.

BRIEF DESCRIPTION OF THE SEVERAL VIEWS OF THE DRAWINGS

Further details, advantages and features of the present invention will emerge from the following description of exemplary embodiments on the basis of the drawing, in which.

DETAILED DESCRIPTION OF THE INVENTION

Figure 1:
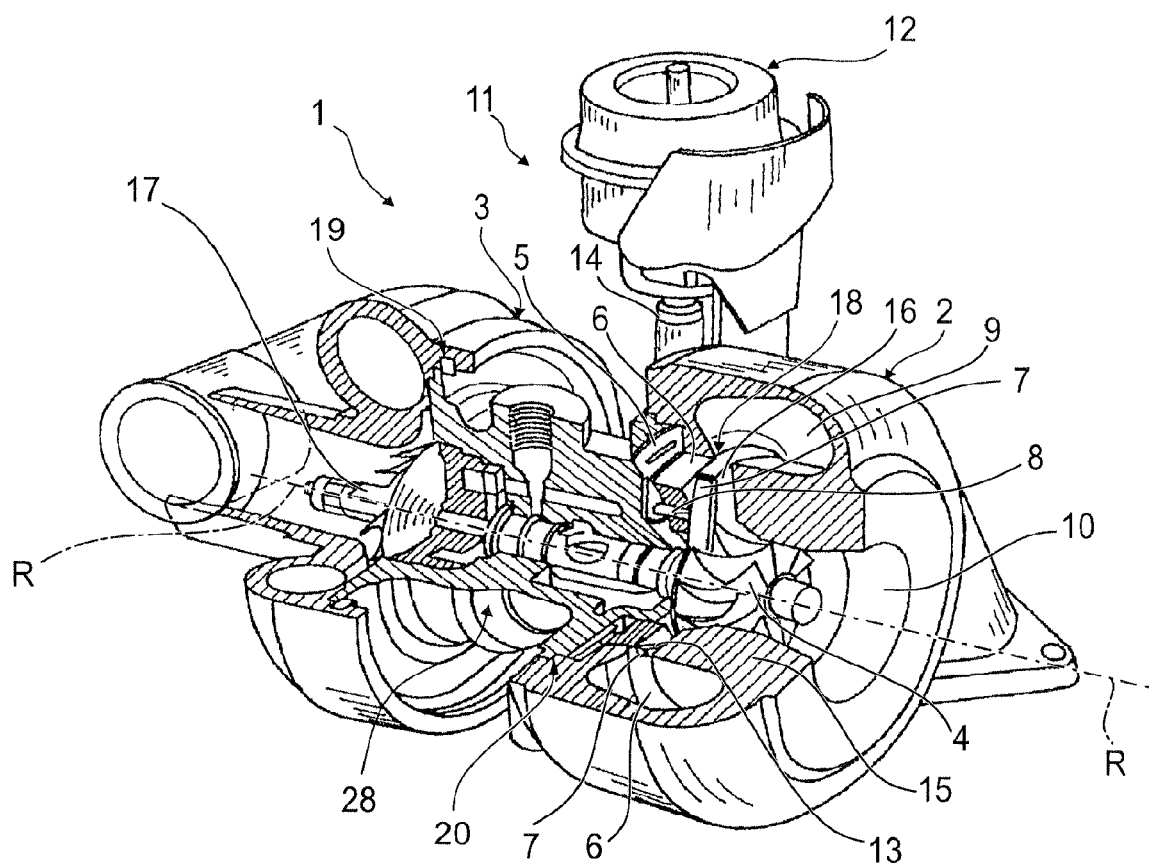
FIG. 1 shows a perspective, partially cut-away illustration of an exhaust-gas turbocharger according to the invention.

FIG. 1 shows one possible embodiment of an exhaust-gas turbocharger 1 according to the invention in a cut-away perspective illustration, which exhaust-gas turbocharger has a turbine housing 2 and a compressor housing 3 which are mounted on the in each case adjacent ends of a bearing housing 28. Here, a first fastening device 19 for fixing the bearing housing 28 to the compressor housing 3 and a second fastening device 20 for fixing the bearing housing 28 to the turbine housing 2 are illustrated in each case in schematically simplified form. The design of the first fastening device 19 will be explained in detail on the basis of the following FIGS. 2 to 5.

All the other components identified by the reference numerals plotted in FIG. 1 are listed in the appended list of reference symbols, but are of secondary significance for explaining the principles of the present invention, and are accordingly optional components of the exhaust-gas turbocharger 1 which need not all imperatively be provided but which may be provided, as shown in FIG. 1.

Figure 2:
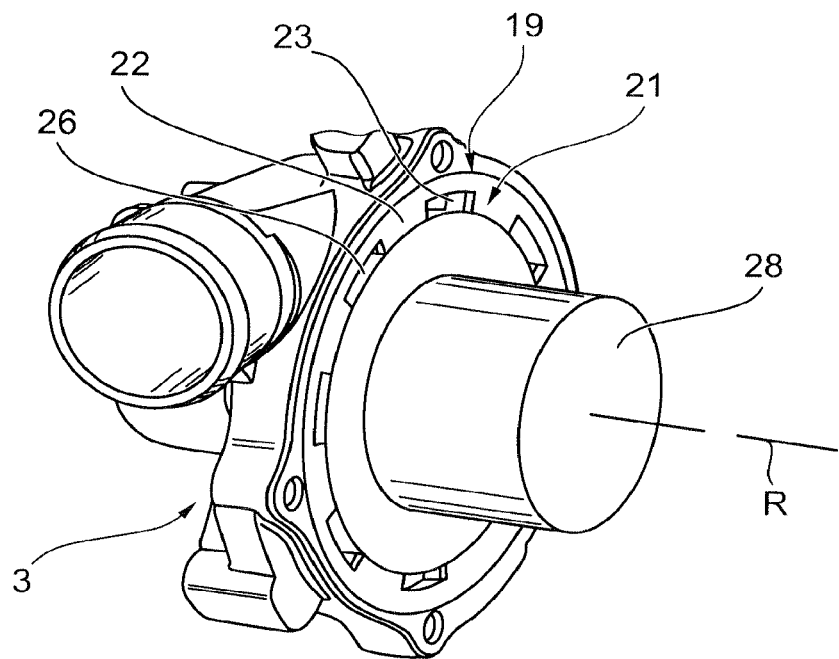
FIG. 2 shows a perspective illustration of the compressor housing of the exhaust-gas turbocharger according to FIG. 1 which, for the explanation of the principles according to the invention, is illustrated in the state in which it is mounted on the bearing housing, wherein the bearing housing is illustrated in highly schematic form as a bearing housing dummy.

FIG. 2 shows a perspective illustration of the compressor housing 3 which can be fixed to the bearing housing 28 by means of the abovementioned first fastening device 19, with FIG. 2 showing the fixed state. As explained in the brief description of the figures, the bearing housing 28 is illustrated in the form of a cylindrical bearing housing dummy, because the structural details of the bearing housing 28 are not required for the explanation of the present invention.

In the embodiment illustrated in FIG. 2, the fastening device 19 has a first fastener ring 21 which is fixed to the bearing housing 3. The fixing may be provided in the ways explained in the introductory part of the description. The fastener ring 21 has a multiplicity of first locking teeth, of which one locking tooth is denoted by the reference numeral 22. The number of locking teeth 22 may vary and may be adapted to the respective exhaust-gas turbocharger type. As can be seen from FIG. 2, the locking teeth 22 are arranged spaced apart from one another, such that clearances or passage openings 26 are formed between the locking teeth 22. As may also be gathered from FIG. 2, the locking teeth 22 point inward toward the rotational or longitudinal axis R of the exhaust-gas turbocharger.

The first connecting device 19 also has a second fastener ring 23 which can be fixed to the bearing housing 28 in the way described above. The second fastener ring 23 has a number of second locking teeth corresponding to the number of first locking teeth 22. Since FIG. 2 shows the mounted state of bearing housing 28 and compressor housing 3, the second locking teeth of the second fastener ring 23 are not visible in FIG. 2. One of said second locking teeth 24 can however be seen from the illustration of FIG. 3. The spacings between the second locking teeth 24 correspond to those of the first locking teeth 22 such that, for mounting, the locking teeth 24 can be plugged through the passage openings 26, and after said locking teeth are plugged through axially in this way, a rotational movement is carried out for the purpose of fixing, as a result of which rotational movement the locking teeth 22 and 24 engage behind one another. The first fastening device 19 is therefore referred to as a plug-and-twist connecting device.

Figure 3:
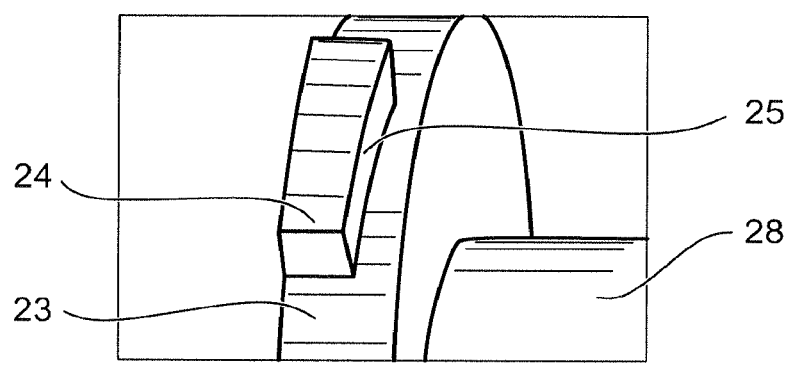
FIG. 3 shows a partial view of the fastener ring of the bearing housing.

To make the mounting process even easier, a run-on bevel 25 may be formed at least on one of the groups of locking teeth 22 and 24, which run-on bevel 25 can be seen in FIG. 3 on the locking tooth 24 of the second fastener ring 23. Out of principle, it is however also possible for both locking tooth groups 22 and 24 to be provided with a run-on bevel 25 of said type.

Figure 4:
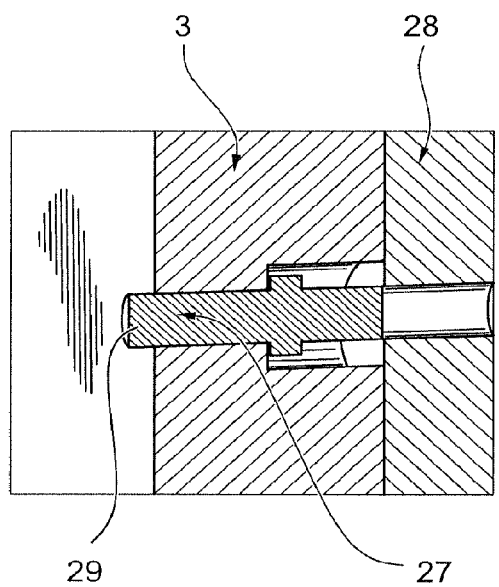
FIGS. 4 and 5 show two illustrations of a securing pin with an indicator for indicating whether mounting has taken place or has not yet taken place.
Figure 5:
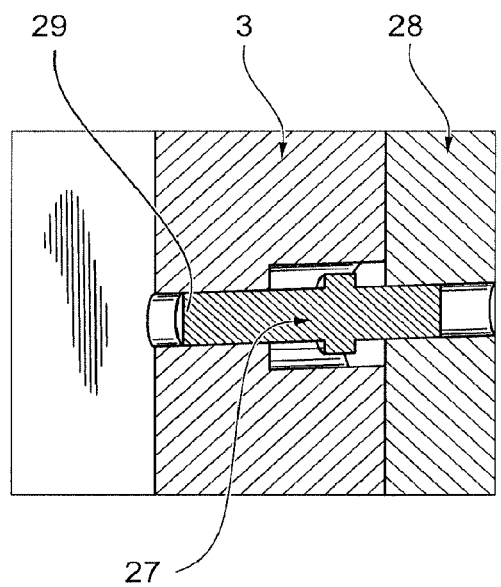

As is evident from the above explanation of the first fastening device 19, the latter constitutes a quick-action connection similar to a bayonet connection and may additionally be provided with a securing pin 27 as can be seen from FIGS. 4 and 5, which securing pin 27 can be inserted into the bearing housing 28 and the compressor housing 3 and has an indicator 29 at one end. Here, the schematically highly simplified illustration of FIG. 4 illustrates the open state, in which the indicator 29 of the securing pin 27 is arranged at the outside.

FIG. 5 illustrates the secured position with the securing pin 27 and indicator 29 in a recessed state.

In addition to the above written disclosure, reference is hereby explicitly made to the diagrammatic illustration thereof in FIGS. 1 to 5.

LIST OF REFERENCE SYMBOLS

1 Turbocharger
2 Turbine housing
3 Compressor housing
4 Turbine rotor
5 Adjusting ring or receiving ring
6 Blade bearing ring
7 Guide blades
8 Pivot axes
9 Supply duct
10 Axial connecting piece
11 Actuating device
12 Control housing
13 Clearance for guide blades 7
14 Plunger element
15 Annular part of the turbine housing 2
16 Spacer/spacer cam
17 Compressor rotor
18 Guide grate
19 First fastening device
20 Second fastening device
21 First fastener ring
22 First locking teeth
23 Second fastener ring
24 Second locking teeth
25 Run-on bevel
26 Clearances/passage openings
27 Securing pin
28 Bearing housing
29 Indicator
R Rotational axis/longitudinal axis

The invention claimed is:

1. An exhaust-gas turbocharger (1), the turbocharger (1) comprising:
   a compressor housing (3) surrounding a compressor wheel, the compressor wheel adapted to drawing air in axially and discharging air radially, the compressor wheel further having a backwall, the compressor housing (3) comprising
      a compressor inlet for intake of air axially upstream of the compressor wheel and
      a compressor outlet for discharge of compressed air radially downstream of the compressor wheel,
      a bearing housing cover plate adjacent the backwall of the compressor wheel,
   a bearing housing (28) having a first end and a second end, and connected to the compressor housing (3) at the bearing housing first end via a first fastening device (19), wherein the first fastening device (19) is a plug-and-twist connecting device, and
   a turbine housing (2) connected to the bearing housing (28) second end via a second fastening device (20), with the compressor housing (3), the bearing housing (28) and the turbine housing (2) extending along an exhaust-gas turbocharger longitudinal axis (R),
   wherein the first fastening device (19) has a first fastener ring (21) which is arranged on the compressor housing (3) and which has first locking teeth (22) which point toward the exhaust-gas turbocharger longitudinal axis (R) and which are arranged spaced apart from one another, and a second fastener ring (23) which is arranged on the bearing housing (28) and which has second locking teeth (24) which point away from the exhaust-gas turbocharger longitudinal axis (R) and which are complementary to the first locking teeth (22) and which are arranged spaced apart from one another.

2. The exhaust-gas turbocharger as claimed in claim 1, wherein the first fastener ring (21) is formed in one piece with the compressor housing (3).

3. The exhaust-gas turbocharger as claimed in claim 2, wherein the first fastener ring (21) and the second fastener ring (23) are formed from the housing blanks of the compressor housing (3) and of the bearing housing (28) respectively via a milling and turning process.

4. The exhaust-gas turbocharger as claimed in claim 1, wherein the second fastener ring (23) is formed in one piece with the bearing housing (28).

5. The exhaust-gas turbocharger as claimed in claim 1, wherein the first fastener ring (21) and the second fastener ring (23) are formed as separate parts which can be connected to the compressor housing (3) and to the bearing housing (28) respectively.

6. The exhaust-gas turbocharger as claimed in claim 1, wherein the first fastening device (19) is provided with a securing pin (27) for preventing the release of the connection between the bearing housing (28) and compressor housing (3).

7. The exhaust-gas turbocharger as claimed in claim 6, wherein the securing pin (27) is provided with an indicator (29).

8. The exhaust-gas turbocharger as claimed in claim 1 wherein the first fastening device (19) is a bayonet connection.

9. An exhaust-gas turbocharger (1), the turbocharger (1) comprising:
   a compressor housing (3) surrounding a compressor wheel, the compressor wheel adapted to drawing air in axially and discharging air radially, the compressor wheel further having a backwall, the compressor housing (3) comprising
      a compressor inlet for intake of air axially upstream of the compressor wheel and
      a compressor outlet for discharge of compressed air radially downstream of the compressor wheel,
   a bearing housing cover plate adjacent the backwall of the compressor wheel,
   a bearing housing (28) having a first end and a second end, and connected to the compressor housing (3) at the bearing housing first end via a first fastening device (19), wherein the first fastening device (19) is a plug-and-twist connecting device, and
   a turbine housing (2) connected to the bearing housing (28) second end via a second fastening device (20), with the compressor housing (3), the bearing housing (28) and the turbine housing (2) extending along an exhaust-gas turbocharger longitudinal axis (R),
wherein the first fastening device (19) is a plug-and-twist connecting device wherein the first fastening device (19) has a first fastener ring (21) which is arranged on the compressor housing (3) and which has first locking teeth (22) which point toward the exhaust-gas turbocharger longitudinal axis (R) and which are arranged spaced apart from one another, and a second fastener ring (23) which is arranged on the bearing housing (28) and which has second locking teeth (24) which point away from the exhaust-gas turbocharger longitudinal axis (R) and which are complementary to the first locking teeth (22) and which are arranged spaced apart from one another, and
wherein at least one of the first locking teeth (22) and second locking teeth (24) is provided with a run-on bevel (25).

\* \* \* \* \*